B. J. DIAZ.
HAT BLOCKING MACHINE.
APPLICATION FILED JAN. 8, 1913.

1,118,638.

Patented Nov. 24, 1914.
7 SHEETS—SHEET 1.

Fig.1.

Witnesses:
John Murtagh
F. Hogg.

Inventor:
Barbaro Jerez Diaz
by Gomer & Goepel
Attorneys.

Fig. 2.

B. J. DIAZ.
HAT BLOCKING MACHINE.
APPLICATION FILED JAN. 8, 1913.

1,118,638.

Patented Nov. 24, 1914.
7 SHEETS—SHEET 4.

Witnesses:
John Murtagh
F. Hogg.

Inventor:
Barbaro Jerez Diaz
by Goepel & Goepel
Attorneys

B. J. DIAZ.
HAT BLOCKING MACHINE.
APPLICATION FILED JAN. 8, 1913.

1,118,638.

Patented Nov. 24, 1914.
7 SHEETS—SHEET 5.

Witnesses:
John Murtagh
F. Hogg.

Inventor:
Barbaro Jerez Diaz
by Gocuex Gocpee
Attorneys

B. J. DIAZ.
HAT BLOCKING MACHINE.
APPLICATION FILED JAN. 8, 1913.

1,118,638.

Patented Nov. 24, 1914.
7 SHEETS—SHEET 7.

Fig. 13.

Witnesses:
John Murtagh
F. Hogg.

Inventor:
Barbaro Jerez Diaz
by Goepel Goepel
attorneys

UNITED STATES PATENT OFFICE.

BARBARO JEREZ DIAZ, OF MADRID, SPAIN.

HAT-BLOCKING MACHINE.

1,118,638. Specification of Letters Patent. Patented Nov. 24, 1914.

Application filed January 8, 1913. Serial No. 740,805.

*To all whom it may concern:*

Be it known that I, BARBARO JEREZ DIAZ, a subject of the King of Spain, residing in Madrid, Spain, have invented certain new and useful Improvements in Hat-Blocking Machines, of which the following is a specification.

The invention relates to improvements in machines for blocking or pressing hats of various shapes by means of fluid pressure, in which the mold consists of upper and lower mold parts and in which the carrier of the lower mold part is adapted to be moved into and locked in the operative position.

The object of the present invention is to simplify and improve the construction of such machines.

According to the present invention, the upper mold part is adjustably suspended from the main frame by means of screw spindles, and a hand wheel is employed for locking the lower mold part carrier in the operative or raised position. An additional hand wheel is also provided for firmly pressing the lower mold part against the upper mold part and hermetically sealing the mold. The upper surface of this additional hand wheel is preferably formed as a ball bearing and is adapted to act against the under surface of the hand wheel which locks the lower mold part carrier in the operative or raised position. A screw spindle is provided in the lower mold part carrier, which spindle may be adjusted by means of another hand wheel formed also as a ratchet wheel, the said screw spindle supporting at its upper end a plate forming the bottom of the mold. This screw spindle may also be operated by a lever, which may be coupled to the ratchet wheel, so as to produce sharp edges upon the top of the hat by a slight further raising of the bottom plate.

The accompanying drawings illustrate one construction of machine embodying the features of the present invention.

Figure 1 is an elevation and Fig. 2 a side view of the machine with the mold in the open position. Fig. 2ᵃ is a side view of the lower part of the machine showing the parts in the position they assume when the mold is closed. Fig. 10 is a plan.

Similar reference numerals indicate the same parts throughout the drawings.

The machine forming the subject of the invention comprises substantially the following five main parts: 1. A device for adjustably suspending the upper mold part. 2. A device for adjustably mounting the lower mold part. 3, A device for actuating the lower mold part and moving same toward the upper mold part. 4. A device for adjusting the lower mold part according to the height of the hat, and 5. A device for mounting the air pressure mold made of india rubber.

Figure 7:
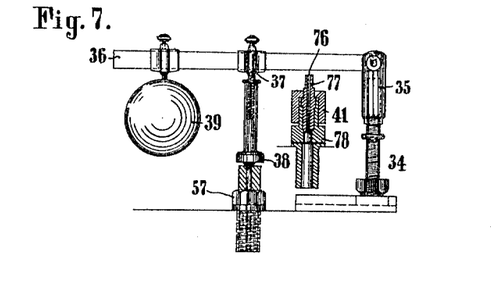
Fig. 7 is a detail view of the safety valve, a non-return valve being also shown in this view.

The upper mold part is mounted on a cylindrical body or support 28 (Figs. 1, 2, 3, 6, 12, 13) which is suspended from the main frame by means of four screw spindles 29. These screw spindles are each provided with two hand wheels 30, 31, and are mounted in cross beams or bridges 5, which in turn are supported on standards 3 of the table 2. By means of the said adjustable screw spindles 29, the cylindrical support 28 of the upper mold part may be adjusted as desired. Upon the support 28 is mounted a combined air pressure admission and non-return valve 41, 76, 77, 78 (Fig. 7), and a manometer 75, also a safety valve of the construction shown in Fig. 7, and consisting of the rod 34, socket 35, lever 36, slide 37, valve head 38, sliding weight 39, and outlet 57. The safety valve may be adjusted in accordance with the allowed maximum pressure, and for this purpose, the sliding weight 39 may be moved along the lever 36. The rod 34 and socket 35 on which the lever 36 is pivoted, are also adapted to be fixed at any desired distance from the valve proper 38, 57. For this purpose, the lower end of the rod 34 is slidable in a suitable way upon the top of the support 28, the lever 36 sliding through the slide 37 which carries the valve head 38. The provision of this safety valve insures that whatever the pressure in the pressure reservoir be, the pressure in the mold will not exceed a certain maximum which may be adjusted beforehand. Upon the underside of the cylindrical support 28 is fixed a hemispherical part 72, which is provided with a central bore through which passes an adjustable pipe 74. This pipe serves for admitting pressure air to the india rubber mold hereinafter described. Between the underside of the cylindrical support 28 and the hemispherical part 72, a small chamber is formed which is closed externally by means of a rubber packing. This chamber communicates through narrow ports with the pressure air admission valve 41, and with the safety valve 57, 38. Upon a screw-threaded flange of the hemispherical part 72 is screwed a ring 73, which fits into the central opening of the upper mold part 33, so that the underside of the ring 73 and the underside of the upper mold part 33 may be adjusted to lie flush. The mold part 33 is fixed to the cylindrical support 28 by means of screws 71 and is surrounded by a heating device 42.

Figure 4:
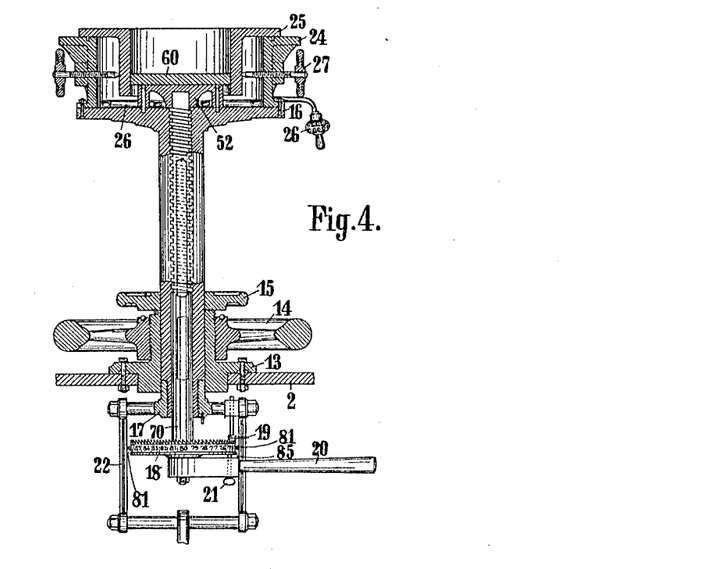
Fig. 4 is a section through the lower part of the mold.
Figure 5:
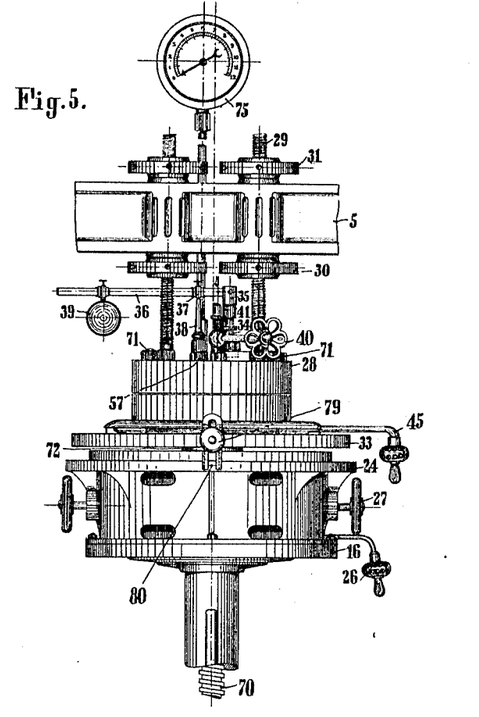
Fig. 5 is a view of the mold showing same in the closed position.
Figure 6:
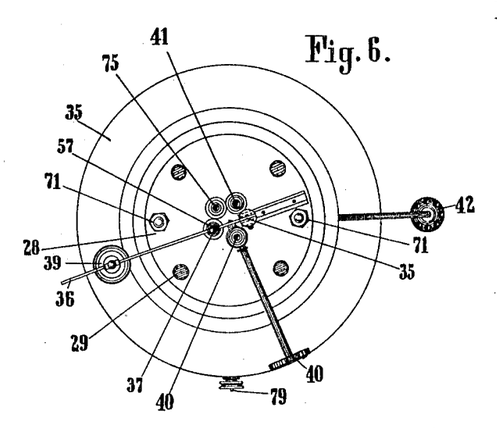
Fig. 6 is a top view of the upper mold part illustrating the various connections for the admission and escape of pressure air.
Figure 12:
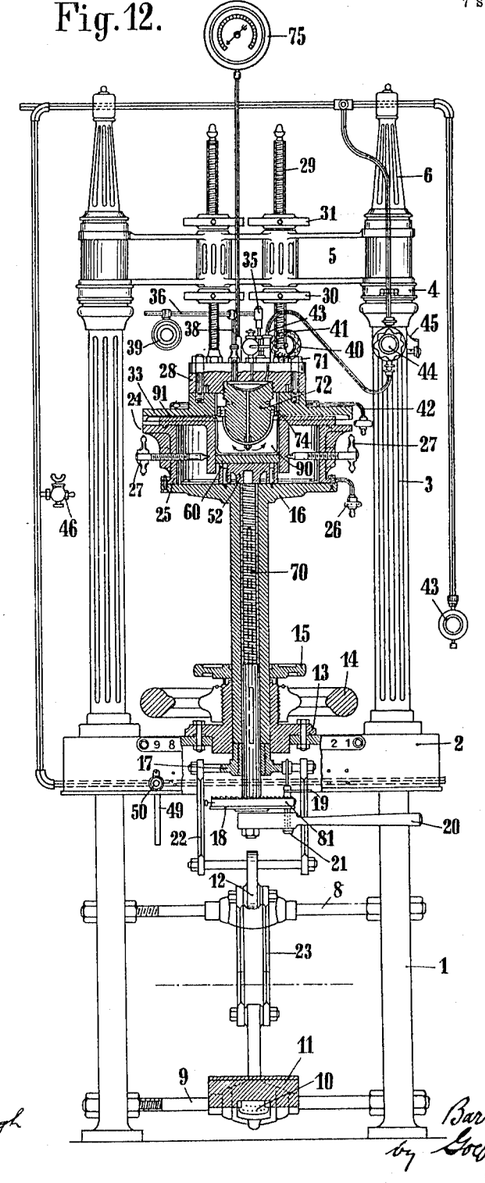
Fig. 12 is an elevation partly in section showing the mold in the closed position.
Figure 13:
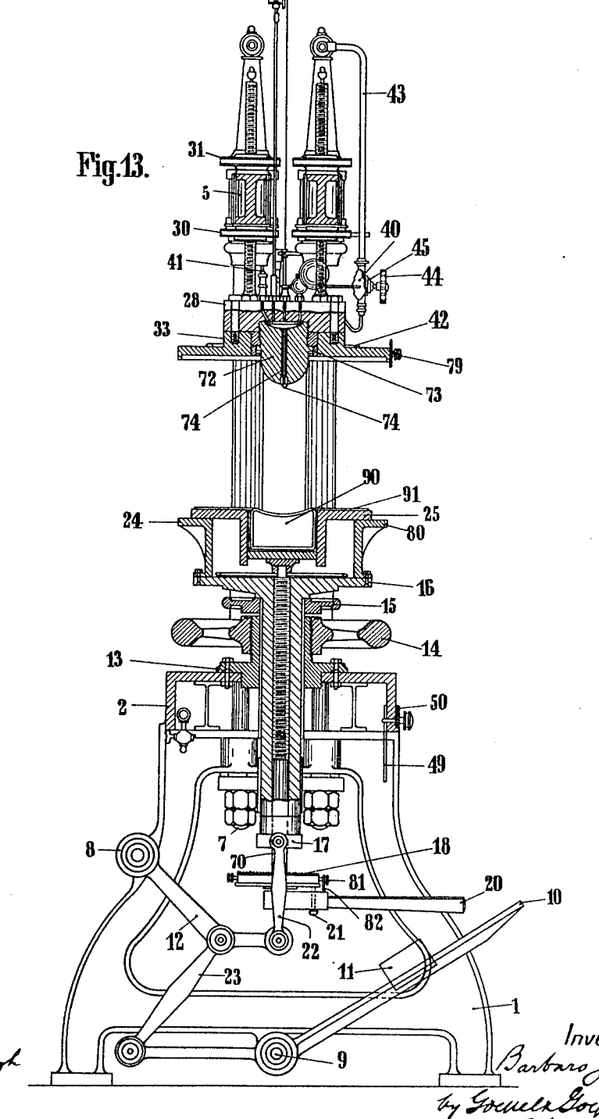
Fig. 13 is an elevation partly in section showing the mold open.

The construction and mounting of the lower part of the mold may be seen from Figs. 4, 12 and 13. A cylindrical part 24 provided with a flange and an internal heating device 26, contains the lower mold proper 25, which may be adjusted from the outside by means of screw spindles and hand wheels 27. The cylindrical part 24 is bolted to a bottom plate 16. The lower mold 25 is provided with an adjustable bottom 60, which may be adjusted by means of a movable slide 52 guided on vertical pins fixed to the plate 16. Into the bore of the slide 52 engages the reduced end of a screw spindle 70, which may be actuated by means of a ratchet wheel 18, lever 20, and bolt 21, as hereinafter described. The lower mold 25 is raised into the operative position by means of a lever mechanism 12, 22, 23, which is actuated by means of a doublearmed pedal lever 10 pivoted at 9. The links 12 are pivoted on an axle 8 mounted in the feet 1 of the machine, and the links 22 are pivoted to a screw collar or ring 17, which is mounted upon the lower end of the tubular extension of the bottom plate 16.

Figure 1:
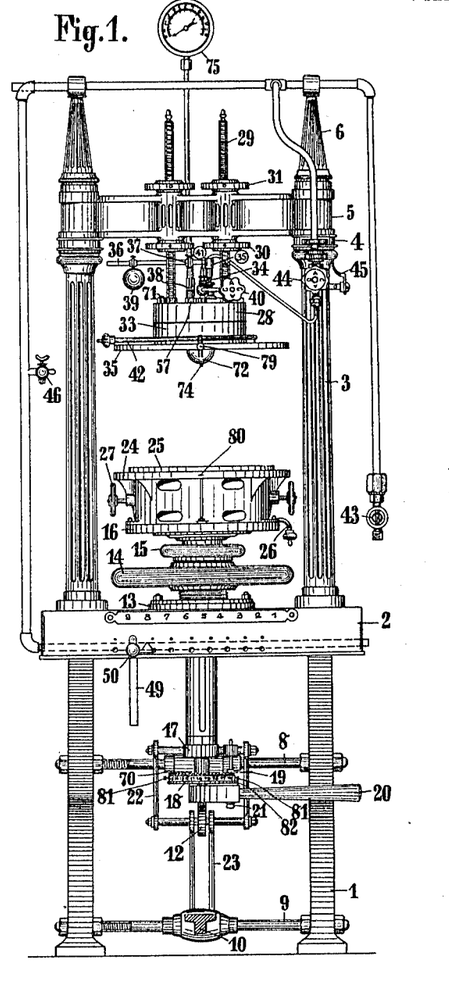
Figure 2:
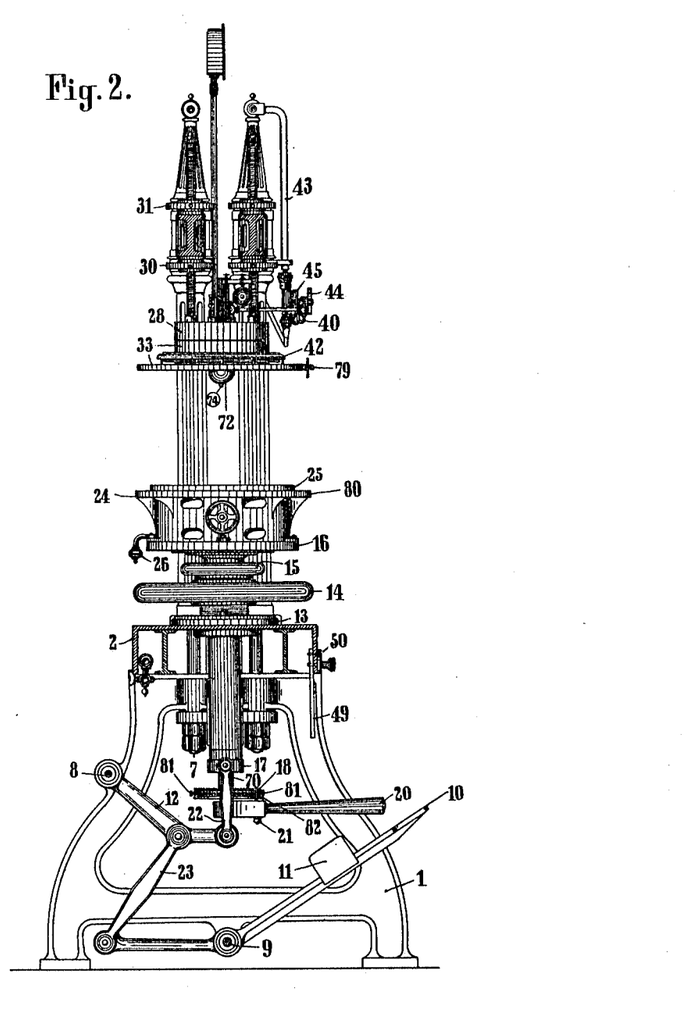
Figure 2A:
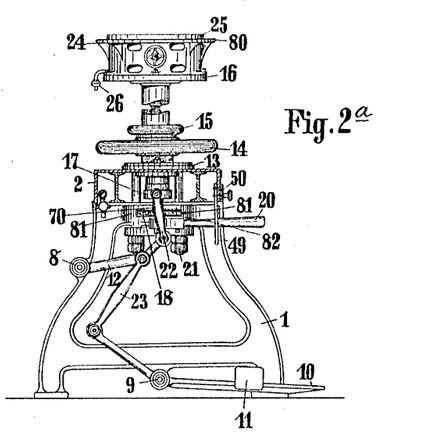
Figure 3:
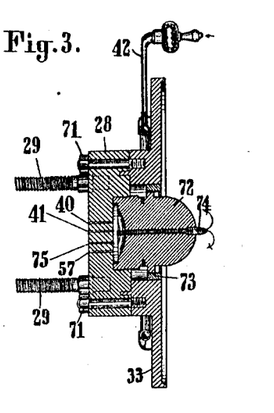
Fig. 3 is a section through the upper part of the mold.

Upon depressing the pedal lever 10, the links 23, 12 and 22 are raised into the position shown in Fig. 2ª, so that the part 24 carrying the lower mold is raised until it comes into contact with the upper mold part 33. A locking wheel 15 is then turned by hand and locked to the tubular extension of the bottom plate 16, suitable projections being formed upon the tubular extension which coöperate with corresponding grooves of the locking wheel 15 when the latter is turned, for example, by 90°. For adjusting the lower mold part in accordance with the height of the hat to be blocked, the spindle 70 is provided with a left hand screw engaging with suitable screw threads of the tubular extension. Upon the lower end of the screw-spindle is mounted a ratchet wheel 18, which is provided upon its periphery with a millimeter scale bearing the numbers 55 to 120. The ratchet wheel 18 may be adjusted by hand and may also be adjusted by means of a lever 20 to which it may be coupled by means of a bolt 21. The ratchet wheel 18 which serves for vertically adjusting the mold bottom 60 is provided upon its underside with equally spaced bore holes which correspond to the millimeter scale provided upon the periphery of the gear. The ratchet wheel 18 is adjusted by hand so as to bring the spindle 70 and the mold bottom 60 into the required vertical position. The lever 20, which is freely mounted on the lower end of the spindle 70, is provided with an index 82, which serves, when the lever is in a certain position, to indicate the position of the mold bottom. This lever may afterward be coupled with the ratchet wheel 18 by inserting the bolt 21 in the right hand position of the lever into the corresponding hole of the gear. The wheel 18 may then be turned by means of the lever 20 whereby the mold bottom 60 may be suitably raised or lowered.

In order to be able to adjust the scale upon the periphery of the ratchet wheel 18, the periphery of the gear is provided with a number of holes corresponding to the number of holes formed in the underside of the gear, the holes upon the periphery being shifted with regard to those on the underside by one-half of a division. The scale is adapted to be fixed in its adjusted position by means of screws 81 engaging into two opposite holes. The pitch of the double screw spindle 70 is 71 mm. per revolution. By this adjustable arrangement of the scale on the ratchet wheel, any inaccuracy which may be caused by the different thicknesses of the mold bottoms may be entirely compensated. The ratchet wheel 18 is provided upon its upper surface with locking teeth into which engages a locking pawl 19 mounted on a pivot depending from the screw collar or ring 17 so that the wheel may be locked in any position.

In order to hermetically seal the mold after the lower mold part has been pressed against the upper mold part by means of the pedal lever 10, there is provided a hand wheel 14, which is screwed upon a tubular projection of the bearing 13 fixed in the table 2. The tubular extension of the bottom plate 16 is guided in the bearing 13.

The upper surface of this wheel 14 is provided with a ball-bearing which acts upon the under surface of the locking wheel 15, whereby the latter together with the spindle 70 and the plate 16 are raised and firmly pressed against the upper mold part.

The plate 33 is provided with a horseshoe shaped scale 79 graduated in millimeters, over which scale a needle or pointer 80 fixed in the edge of the lower part 24 of the mold is adapted to act. The scale serves for indicating the number of millimeters in which the hat brim may be reduced by suitable pressure.

The device for mounting the india rubber mold or bag 59 consists of a ring 51 which is formed upon its underside with an annular rib by means of which it rests upon the lower mold part 25. This ring 51 is provided upon its upper surface with a semi-circular annular groove into which enters a suitable annular rib of the upper mold part 33. Between the groove of the ring 31 and the annular rib of the upper mold part 33 is clamped the rubber mold, that is, the rubber bag or cap 59, by means of which the pressing operation proper is effected. It will be seen that the rubber bag 59 is very accurately clamped between the ring 51 and the mold part 33.

If it is desired to press hats having a curled or bent brim, arched or otherwise shaped mold parts may be substituted for the flat upper mold part 33. Such an arched upper mold part may consist of a spherical body 61 which may be secured to the support 28 by means of two bolts 71. This body is provided with a flange to which is fixed a ring 62 by means of bolts. The rubber mold may be clamped between the flange and the ring.

Figure 8:
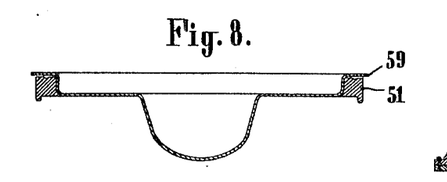
Fig. 8 is a section through the rubber mold carrier.
Figure 9:
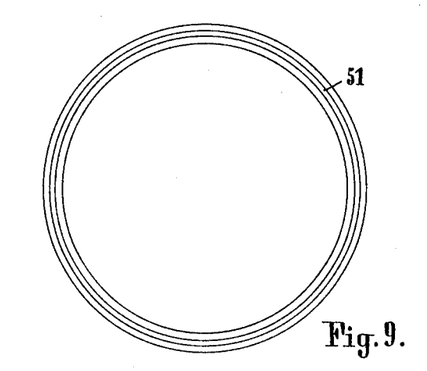
Fig. 9 is a corresponding top view.
Figure 10:
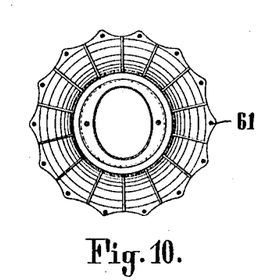
Figure 11:
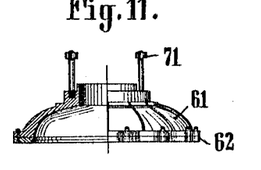
Fig. 11 is an elevation partly in section of a modified construction of the upper mold part adapted for pressing hats having a curled brim.

The diaphragm shown in Figs. 8 and 9 is used for blocking special shapes of hats, and no aperture is necessary. This diaphragm is held in position by the ring 51 which rests upon the mold-holder 24, the edges of the diaphragm protruding slightly beyond the edge of said ring and being caught against the edge of the plate 33 when the mold-holder is brought up against the latter. A hermetical joint is thus formed and air pressure may then be introduced through the nozzle 74.

The operation of the machine is as follows: The machine is first placed in the position shown in Fig. 1, the upper and the lower parts being separated. The mold 25 is now inserted into the support 24 and the bottom 60 of the mold is placed upon the support 52. The heating devices 26 and 42 are now brought into action. The bottom 60 of the mold is now raised by means of the lifting device previously described, to a position which corresponds to the height of the hat to be pressed. The hat is now inserted into the mold and the india rubber bag is inserted into the cavity of the hat. The pedal lever 10 is now depressed, whereby the lower mold part is pressed against the upper mold part, the hemispherical part 70 of the upper mold part and the pipe 74 entering into the cavity of the india rubber bag 59. The lower mold part is now firmly pressed against the upper mold part by first turning the hand wheel 15 so as to lock the same upon the tubular extension and by then turning the hand wheel 14 so as to raise the lower mold part. Air pressure is now admitted by closing the escape valve 40, and by opening the admission valve 44. When the desired pressure is reached, which pressure may be read upon the manometer 75, the valve 44 is closed. The air pressure between the admission valve 44 and the non-return valve 41 may now be removed by means of another valve 45, the pressure in the rubber mold 59 being retained owing to the provision of the non-return valve 41. As stated above, the safety valve 38, 57 prevents any excess of pressure in the mold. The sharp edges upon the top of the hat may be produced by further raising the bottom 60 by means of a screw spindle 70 and a lever 20. After this operation, the discharge valve 40 is opened. The hand wheel 14 is screwed back and the locking wheel 15 is moved into the normal position whereupon the lower mold part is allowed to descend under the influence of its own weight. If a lower mold part is used which has a stationary bottom plate instead of the movable plate above described, the sharp top edges of the hat may be produced by inserting into the mold a ring of hard rubber.

Instead of the diaphragm (Fig. 9), a closed rubber bag may be used, provided with an aperture in its upper surface, the bag being placed in the mold-holder and being admitted through the aperture in the nozzle 74. When the bag 90 is used, a packing ring 91 is also employed for making a tight joint.

I claim:

1. A hat-blocking machine, comprising a main-frame, an upper stationary mold-portion, a lower mold portion, said portions together forming a closed fluid-pressure mold, a carrier for the lower mold-portion, means for moving said carrier toward and from the upper mold-portion, means for locking said carrier in operative position of the molds, and adjustable means supporting the upper mold-portion at a plurality of points from the main-frame.

2. A hat-blocking machine, comprising a main-frame, an upper mold-portion, a lower mold-portion, said portions forming together a closed fluid-pressure mold, a carrier for the lower mold-portion, means for moving said carrier toward and from the upper mold-portion, means for locking said carrier in operative position of the molds, and means acting on said locking means for still further pressing the lower mold-portion toward the upper mold-portion.

3. A hat-blocking machine, comprising a main-frame, an upper mold-portion, a lower mold-portion, said portions forming together a closed fluid-pressure mold, said lower mold-portion having an open bottom, a screw-spindle, a plate carried thereby in the bottom of the lower mold-portion, a hand-wheel on said screw-spindle for raising and lowering the same, and provided with ratchet-teeth, and a hand-lever engaging the teeth of said hand-wheel for operating the same.

In testimony, that I claim the foregoing as my invention, I have signed my name in presence of two subscribing witnesses.

BARBARO JEREZ DIAZ.

Witnesses:
 ALFONSO LOPEZ,
 JOSE M. GAY.

Copies of this patent may be obtained for five cents each, by addressing the "Commissioner of Patents, Washington, D. C."